US012415473B2

(12) United States Patent
An et al.

(10) Patent No.: US 12,415,473 B2
(45) Date of Patent: Sep. 16, 2025

(54) AIRBAG CHUTE-INTEGRATED CRASH PAD ASSEMBLY AND METHOD OF MANUFACTURING SAME

(71) Applicants: HYUNDAI MOTOR COMPANY, Seoul (KR); KIA CORPORATION, Seoul (KR); KBI DONGKOOK IND. CO., LTD., Seoul (KR); HYUNDAI MOBIS CO., LTD., Seoul (KR)

(72) Inventors: Jae-Hyun An, Seosan-si (KR); Min-Ha Lee, Seongnam-si (KR); Chang-Hoon Yang, Hwaseong-si (KR); Young-Chan Cho, Yongin-si (KR); Neung-Han Kim, Ansan-si (KR); Dong-Hyuk Choi, Ulsan (KR); Dong-Il Son, Ulsan (KR); Chang-Woo Kang, Hwaseong-si (KR); In-Han Jeong, Asan-si (KR)

(73) Assignees: HYUNDAI MOTOR COMPANY, Seoul (KR); KIA CORPORATION, Seoul (KR); KBI DONGKOOK IND. CO., LTD., Seoul (KR); HYUNDAI MOBIS CO., LTD., Seoul (KR)

( * ) Notice: Subject to any disclaimer, the term of this patent is extended or adjusted under 35 U.S.C. 154(b) by 23 days.

(21) Appl. No.: 18/369,602

(22) Filed: Sep. 18, 2023

(65) Prior Publication Data

US 2024/0300432 A1 Sep. 12, 2024

(30) Foreign Application Priority Data

Mar. 9, 2023 (KR) ........................ 10-2023-0031110

(51) Int. Cl.
*B60R 21/045* (2006.01)
*B29C 44/12* (2006.01)
(Continued)

(52) U.S. Cl.
CPC ........ *B60R 21/045* (2013.01); *B29C 44/1266* (2013.01); *B29C 45/0005* (2013.01);
(Continued)

(58) Field of Classification Search
CPC ... B60R 21/045; B60R 21/205; B60R 21/215; B60R 2021/21537; B60R 21/2165;
(Continued)

(56) References Cited

U.S. PATENT DOCUMENTS 5,639,115 A * 6/1997 Kelley ................ B60R 21/2165
280/732
8,590,923 B2 11/2013 An
(Continued)

FOREIGN PATENT DOCUMENTS

DE  202019104741 U1 * 12/2019 ........... B60R 21/205
EP  3034361 B1 * 4/2018 ......... B29C 45/1418
(Continued)

*Primary Examiner* — Drew J Brown
(74) *Attorney, Agent, or Firm* — Lempia Summerfield Katz LLC

(57) ABSTRACT

An airbag chute-integrated crash pad assembly includes: a main core that includes a door portion expanding when an airbag expands, and a cover portion mounted on a dash board. In particular, the main core is formed with a reinforcement portion extending downward from a lower surface of the cover portion, and the door portion and the cover portion are separated by a hinge groove that is formed in a lower surface of the main core and forms an expansion line. The reinforcement portion is combined with an airbag accommodation body that accommodates a passenger airbag (PAB). Thus, process optimization can be realized by omitting a process of machining a score and fusing a PAB chute, and also a problem of damage to the PAB chute can be solved.

12 Claims, 9 Drawing Sheets

(51) Int. Cl.
  *B29C 45/00* (2006.01)
  *B29C 45/14* (2006.01)
  *B29K 105/00* (2006.01)
  *B29K 105/04* (2006.01)
  *B29K 105/08* (2006.01)
  *B29K 105/12* (2006.01)
  *B29K 105/20* (2006.01)
  *B29L 31/30* (2006.01)
  *B60R 21/205* (2011.01)
  *B60R 21/215* (2011.01)

(52) U.S. Cl.
  CPC .. *B29C 45/14008* (2013.01); *B29C 45/14819* (2013.01); *B60R 21/205* (2013.01); *B60R 21/215* (2013.01); *B29K 2105/0038* (2013.01); *B29K 2105/04* (2013.01); *B29K 2105/0845* (2013.01); *B29K 2105/12* (2013.01); *B29K 2105/20* (2013.01); *B29L 2031/3038* (2013.01); *B60R 2021/21537* (2013.01)

(58) Field of Classification Search
  CPC . B60R 21/20; B60R 13/0256; B29C 44/1266; B29C 45/0005; B29C 45/14008; B29C 45/14819; B29K 2105/0038; B29K 2105/04; B29K 2105/0845; B29K 2105/12; B29K 2105/20; B29L 2031/3038
  See application file for complete search history.

(56) References Cited

U.S. PATENT DOCUMENTS

| | | | |
|---|---|---|---|
| 10,640,070 B2 | 5/2020 | An et al. | |
| 2003/0047915 A1* | 3/2003 | Sun | B60R 21/205 280/728.1 |
| 2003/0080540 A1* | 5/2003 | Kinane | B60R 21/215 280/743.1 |
| 2007/0102903 A1* | 5/2007 | Kong | B60R 21/205 280/752 |
| 2012/0104732 A1 | 5/2012 | An | |
| 2014/0044926 A1* | 2/2014 | Twork | B32B 27/32 428/167 |
| 2018/0345898 A1 | 12/2018 | An et al. | |
| 2021/0155198 A1* | 5/2021 | Byers | B60R 21/2165 |

FOREIGN PATENT DOCUMENTS

| | | | | |
|---|---|---|---|---|
| EP | 3625089 B1 | * | 1/2022 | ............. B23K 20/12 |
| GB | 2379421 A | * | 3/2003 | ......... B60R 21/2165 |
| KR | 20040106609 A | * | 12/2004 | |
| KR | 20090125617 A | * | 12/2009 | |
| KR | 20120045640 A | | 5/2012 | |
| KR | 101230829 B1 | | 2/2013 | |
| KR | 20180131171 A | | 12/2018 | |
| WO | WO-2023154330 A1 | * | 8/2023 | |
| WO | WO-2024229168 A2 | * | 11/2024 | |

* cited by examiner

<OCCURRENCE OF SINK>

<REDUCTION IN NUMBER OF SINKS>

AIRBAG CHUTE-INTEGRATED CRASH PAD ASSEMBLY AND METHOD OF MANUFACTURING SAME

CROSS-REFERENCE TO RELATED APPLICATION

This application claims priority to Korean Patent Application No. 10-2023-0031110, filed on Mar. 9, 2023, the entire contents of which are incorporated herein by reference.

BACKGROUND

Field of the Disclosure

The present disclosure relates to a crash pad assembly for accommodating and expanding a vehicle airbag.

Description of Related Art

An airbag apparatus is generally installed in a vehicle for the safety of an occupant of the vehicle. Among airbags, a passenger airbag (PAB) is an airbag for protecting a passenger who sits on a passenger seat adjacent to a driver's seat.

The PAB is installed inside a crash pad 100 as illustrated in FIG. 1. FIG. 2 is a cross-sectional view taken along line A-A' on FIG. 1.

A score 11, which is finely machined by milling or a laser along an expansion line, is formed on the main core 10 of the crash pad 100, and a PAB chute 20 accommodating a passenger airbag (PAB) 30 is combined with a lower portion of the main core 10.

The PAB chute 20 is separated into a first portion that is combined with the lower portion of the main core 10 and a second portion that surrounds an airbag 30. A hinge 21 in the shape of the letter V or the like is formed on the first portion of the PAB chute 20 that is combined with the lower portion of the main core 10. Thus, when a vehicle accident occurs, the PAB chute 20 is rotated about the hinge 21 to open.

The PAB chute 20 is fused with the main core 10, and a protrusion 22 is formed on an upper surface of the PAB chute 20 in order to support the main core 10 by being combined therewith.

Accordingly, the PAB chute 20 has a structure in which the PAB expands through an airbag door of the PAB chute 20 when a vehicle accident occurs. In this structure, the airbag door includes a cutting portion and a hinge portion, and the PAB chute 20 is open toward the designated cutting line (a path for the airbag expansion) of the crash pad 100. Thus, the PAB may expand.

This existing airbag system requires a process of machining the score 11 and a process of separately fusing the PAB chute 20.

In addition, when the PAB chute 20 is open and the PAB expands, there occurs a problem in that a fusion portion of the PAB chute 20 is damaged.

The matters described above are intended to help an understanding of the background of the present disclosure and may include matters that, although not referred to as the related art, are known to a person of ordinary skill in the art to which the present disclosure pertains.

SUMMARY OF THE DISCLOSURE

An object of the present disclosure, which is contrived to solve the above-mentioned problem, is to provide an airbag chute-integrated crash pad assembly capable of realizing process optimization by omitting a process of machining a score, a process of fusing a PAB chute, and the like, and thus a problem of damage to a fusion portion of the PAB chute is resolved. The present disclosure also provides a method of manufacture the airbag chute-integrated crash pad assembly.

According to an aspect of the present disclosure, an airbag chute-integrated crash pad assembly includes: a main core that includes a door portion expanding when an airbag expands, and a cover portion mounted on a dash board. The cover portion corresponds to an outside region of the door portion. The airbag chute-integrated crash pad assembly further includes a reinforcement portion extending downward from a lower surface of the cover portion, wherein the door portion and the cover portion are separated by a hinge groove that is formed in a lower surface of the main core and forms an expansion line, and the reinforcement portion is combined with an airbag accommodation body that accommodates a passenger airbag (PAB).

In the airbag chute-integrated crash pad assembly, a hinge groove may be additionally formed in a lower surface of the door portion in such a manner as to extend across the door portion.

In the airbag chute-integrated crash pad assembly, multiple reinforcement portions may be formed on a lower surface of the cover portion along the circumference of the door portion.

In the airbag chute-integrated crash pad assembly, the multiple reinforcement portions may be arranged to be spaced apart from each other.

In the airbag chute-integrated crash pad assembly, a pair of reinforcement portions may be formed in such a manner as to extend vertically downward from a lower surface of the cover portion.

The airbag chute-integrated crash pad assembly may further include a plurality of insert nuts formed between the pair of reinforcement portions, in such a manner as to be spaced apart from each other.

In the airbag chute-integrated crash pad assembly, the plurality of insert nuts may be integrally formed with the main core by injection for insert.

In the airbag chute-integrated crash pad assembly, each of the plurality of insert nuts may include: a head portion having an outside diameter that decreases toward the downward direction; a neck portion extending from a lower end of the head portion; a connection portion extending from a lower end of the neck portion and having an outside diameter that increases toward the downward direction; and a body portion extending from a lower end of the connection portion and having a space inside.

In the airbag chute-integrated crash pad assembly, a lateral surface of the head portion and a lateral surface of the connection portion of each of the plurality of insert nuts may make an angle of 60°±5° with respect to each other, when viewed from the side.

The airbag chute-integrated crash pad assembly may further include a scrim provided as a fabric woven from yarns, portions of the scrim being built into the insides, respectively, of the door portion, the cover portion, and the reinforcement portion by injection for insertion.

In the airbag chute-integrated crash pad assembly, the portions of the scrim may be built into the door portion and the cover portion, respectively, in such a manner as to be parallel to lower surfaces, respectively, of the door portion and the cover portion.

In the airbag chute-integrated crash pad assembly, the portion of the scrim may be built into the reinforcement portion in such a manner as to be parallel to a lateral surface of the reinforcement portion and may make a right angle with respect to the portions of the scrim that are built into the door portion and the cover portion, respectively.

In the airbag chute-integrated crash pad assembly, the portion of the scrim may be built into the reinforcement portion in such a manner as to have a parallelly extending part that is in parallel to the lateral surface of the reinforcement portion and a sideways extending part that extends downward from a lower end portion of the parallelly extending part.

In the airbag chute-integrated crash pad assembly, a pore may be formed inside the main core by foaming injection.

According to another aspect of the present disclosure, there is provided a method of manufacturing the airbag chute-integrated crash pad assembly, the method including: pre-forming the scrim; and forming the main core by injection, with the scrim being inserted into a mold.

In the method, in the pre-forming of the scrim, the scrim may be pre-formed in such a manner that the portion of the scrim that is built into the reinforcement portion makes a right angle with respect to the portions of the scrim that are built into the door portion and the cover portion, respectively.

In the method, in the forming of the main core, the main core may be formed by injection, with a plurality of insert nuts being inserted into the mold, in such a manner that the plurality of insert nuts are integrally formed between the pair of reinforcement portions.

In the method, in the forming of the main core, a foaming plasticizer, along with resin for injection, may be additionally foaming-injected in such a manner that a pore is formed inside the main core.

In the method, the foaming plasticizer may account for 1 weight %±0.2 weight % of the resin for injection.

In the crash pad assembly according to the present disclosure, the PAB chute is integrally formed with the C/PAD main core. Thus, process optimization can be realized, which is not the case in the related art. A fusion process is omitted. Thus, a fundamental problem of damage to the fusion portion of the PAB that occurs when the PAB expands can be solved.

In addition, the scrim inserted into an integrated structure functions as a hinge. Thus, the PAB can expand in a more stable manner by preventing breakage of a hinge.

The application of the insert nut eliminates the need to use a slide core in the related art. Thus, a design restriction can be minimized.

BRIEF DESCRIPTION OF THE DRAWINGS

In order that the disclosure may be well understood, there will now be described various forms thereof, given by way of example, reference being made to the accompanying drawings, in which.

DESCRIPTION OF SPECIFIC EMBODIMENTS

In order to get a full understanding of the present disclosure, operational advantages thereof, and the object thereof that is accomplished by desired embodiments thereof, reference should be made to the accompanying drawings in which the desired embodiment thereof is illustrated and the contents of the drawings.

A well-known technology associated with the desired embodiment, when it makes the nature and gist of the present disclosure unnecessarily obfuscated, is briefly mentioned, and a description of a constituent element according to the present disclosure is not redundantly repeated.

Figure 1:
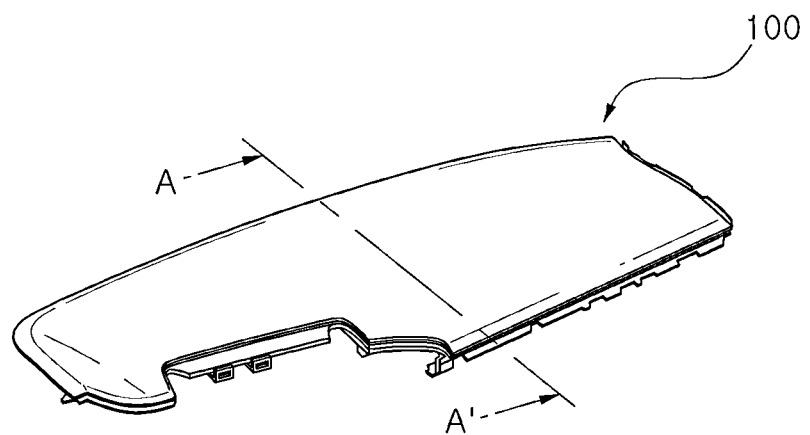
FIG. 1 is a view illustrating a crash pad.
Figure 2:
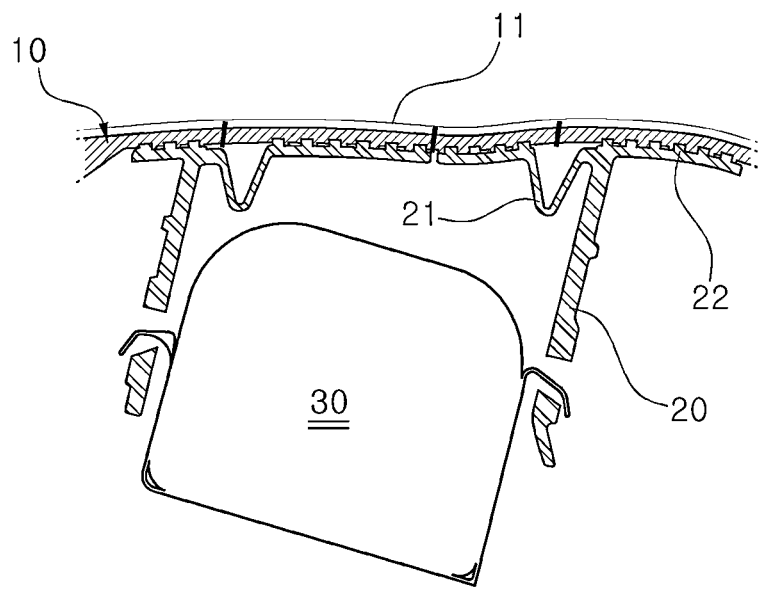
FIG. 2 is a cross-sectional view illustrating an existing airbag system along line A-A' on FIG. 1.
Figure 3:
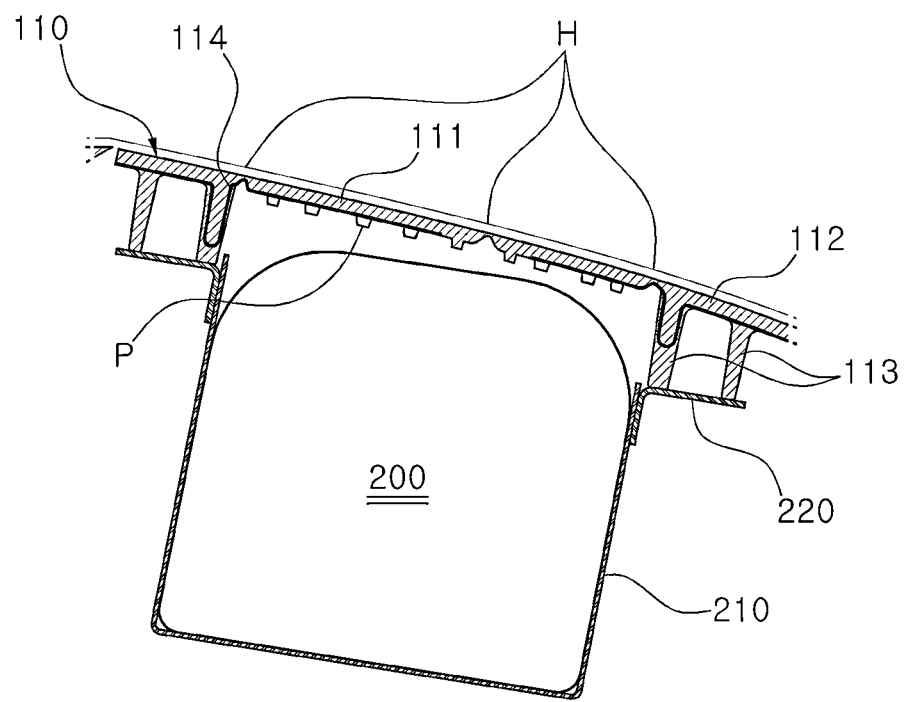
FIGS. 3 and 4 are cross-sectional views illustrating a crash pad assembly along line A-A' on FIG. 1 according to an embodiment of the present disclosure.
Figure 4:
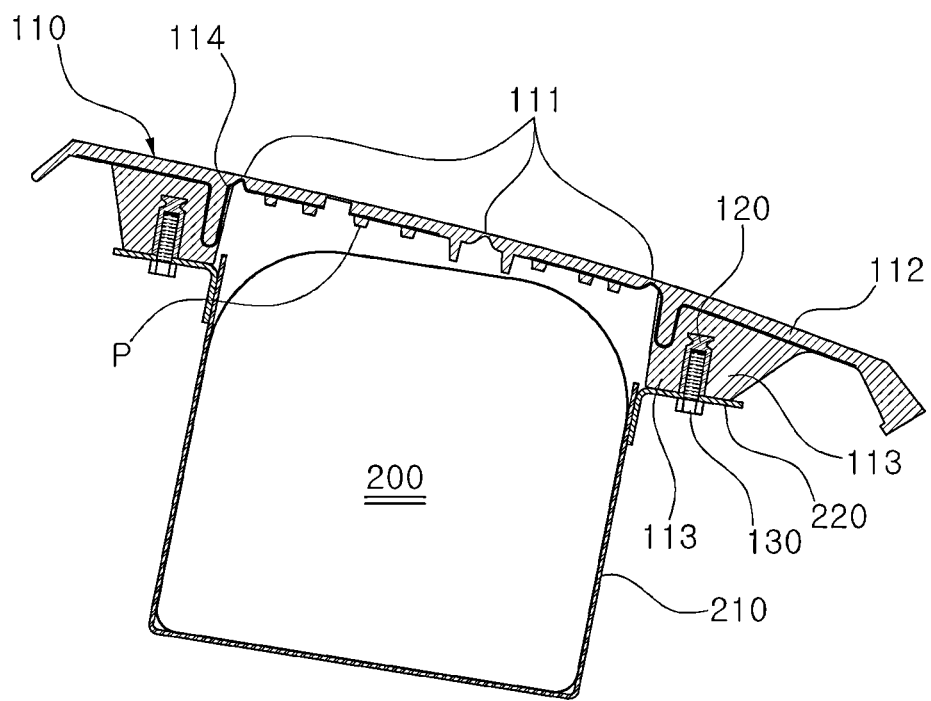

FIG. 1 is a view illustrating a crash pad. FIGS. 3 and 4 are cross-sectional views illustrating a crash pad assembly along line A-A' in FIG. 1 according to an embodiment of the present disclosure.

An airbag chute-integrated crash pad assembly according to a first embodiment of the present disclosure and a method of manufacturing the airbag chute-integrated crash pad assembly according to a second embodiment of the present disclosure are described below with reference to FIGS. 1, 3, and 4.

The crash pad assembly according to the present disclosure is configured in such a manner that a passenger airbag (PAB) 200 accommodated inside the crash pad assembly is expandable according to an expansion signal. The crash pad assembly is manufactured in such a manner that an airbag chute is integrally formed, instead of employing an existing configuration in which a main core and the PAB chute are separated from each other.

In other words, the crash pad assembly includes an insert nut 120 that couples an airbag chute-integrated main core 110 and an airbag accommodation body 210 to each other.

A main core 110 may include a door portion 111 and a cover portion 112. The door portion 111 is provided inward in such a manner that it is coupled to the airbag accommodation body 210 accommodating the passenger airbag (PAB) 200 and expands as an airbag expands. The cover portion 112 corresponds to an outside portion of the door portion 111 and is mounted on a dash board. A reinforcement portion 113 that extends downward from a lower surface of the cover portion 112 is integrally formed with the main core 110.

The door portion 111 and the cover portion 112 are separated by a hinge groove H formed in a lower surface of the main core 110. The hinge groove H is also formed in a lower surface of the door portion 111, extending across the door portion 111. The hinge groove H corresponds to an expansion line and thus, the door portion 111 expands and is divided into two parts along the hinge groove H, which extends across the door portion 111.

The hinge groove H may be formed in a lower surface of the crash pad assembly 100. Thus, there is no need for separate machining of a score.

For supportive rigidity, a plurality of protrusions P may be formed in a lower surface of the door portion 111.

In the crash pad assembly 100, the reinforcement portion 113 is integrally formed on the lower surface of the cover portion 112. In particular, the reinforcement portion 113 may extend downward from the lower surface of the cover portion 112. Thus, the reinforcement portion 113 substitutes for an existing chute, thereby eliminating the need for a fusion portion of the existing chute.

In one embodiment, the reinforcement portions 113 in one pair are spaced apart from each other and are formed outside the door portion 111 along the circumference of the door portion 111.

The reinforcement portion 113 may be formed in a manner that extends vertically downward from the cover portion 112.

Furthermore, a plurality of insert nuts 120 is formed in a spaced manner into the reinforcement portions 113, respectively, that are formed in a spaced manner.

As illustrated in FIG. 4, when the main core 110 is manufactured, the insert nut 120 is integrally formed into the reinforcement portion 113 by injection for insertion.

In order to support that the door portion 111 that expands, a scrim 114 is formed into the main core 110 by the injection for insertion.

Figure 5:
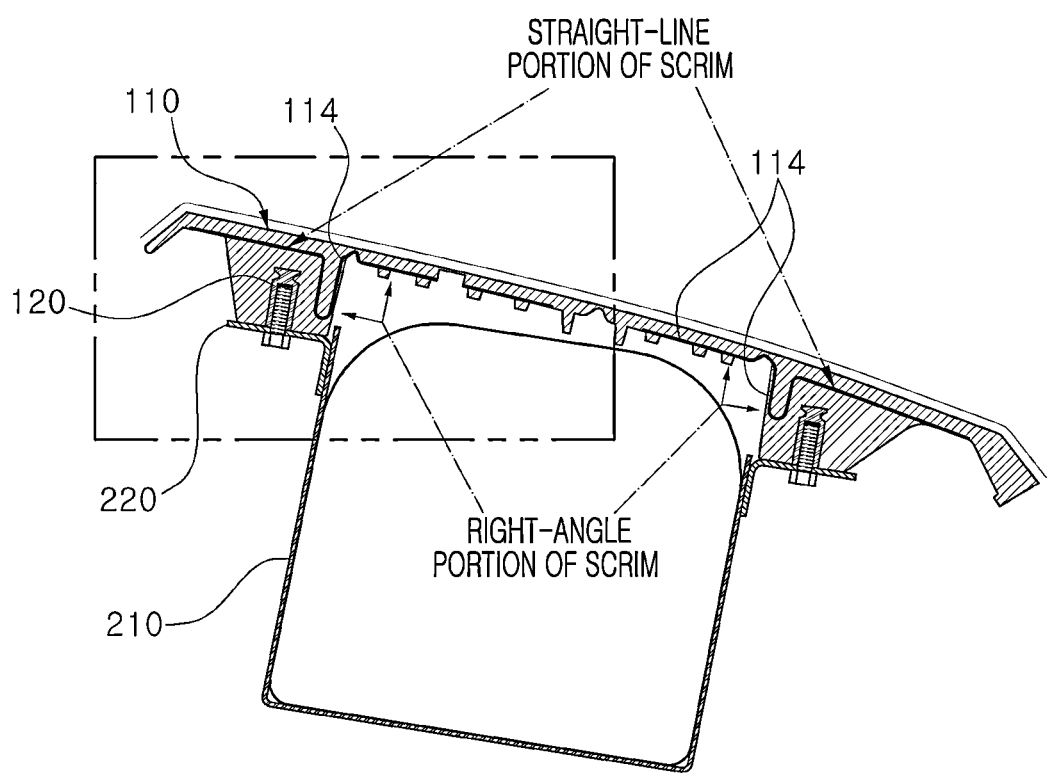
FIG. 5 is a view illustrating a structure of a scrim of the crash pad assembly according to an embodiment of the present disclosure.
Figure 6:
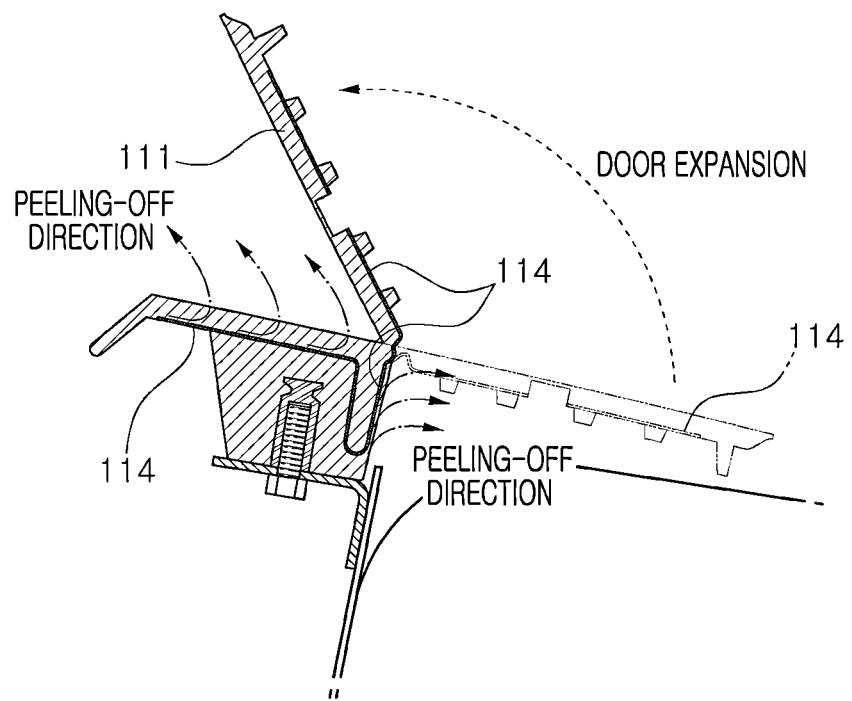
FIG. 6 is an enlarged view illustrating a box-like portion in FIG. 5 when the crash pad assembly is in operation (marked by an alternate long and two short dash lines) according to the present disclosure.

FIGS. 5 and 6 are views that are referred to for description of a structure of the scrim 114.

The scrim 114 is a fabric woven from yarns, and portions thereof are formed in a lower portion of the inside of the door portion 111, a lower portion of the inside of the cover portion 112, and a lateral portion of the inside of the reinforcement portion 113, respectively.

Therefore, the portion of the scrim 114 that is formed within the cover portion 112 is in a straight line in parallel to the lower surface of the cover portion 112, and the scrim 114 within the door portion 111 and the portion of the scrim 114 that is formed within the reinforcement portion 113 make a right angle with respect to each other.

For this shape, the scrim 114 is pre-formed in such a manner as to have a right-angle structure and is formed within the main core 110 by the injection for insertion.

The reason for forming the scrim 114 having this structure is to prevent a phenomenon where the scrim 114 peels off when the door portion 111 expands. Since the main core 110 employs the structure where the portion of the scrim 114 that is formed within the door portion 111 and the portion of the scrim 114 that is formed within the reinforcement portion 113 make a right angle with each other, as illustrated in FIG. 6, the straight-line portion of the scrim 114 and the portion of the scrim 114 that is formed within the reinforcement portion 113 reel off in different directions. Accordingly, stress can be endured when the door portion 111 expands. Thus, the scrim 114 can be maximally suppressed from reeling off.

To this end, it is desired that the portion of the scrim 114 that is formed within the reinforcement portion 113 maximally extends downward up to a lower surface of the reinforcement portion 113 (to form a parallelly extending part) and then extends sideways (to form a sideways extending part).

Figure 7:
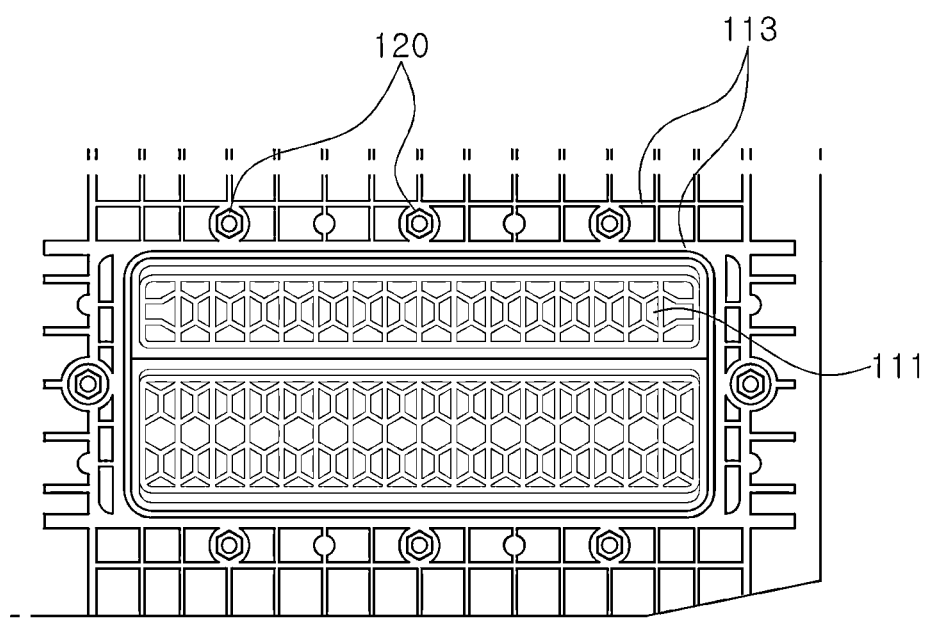
FIG. 7 is a view illustrating a rear-surface shape of the crash pad assembly according to an embodiment of the present disclosure.
Figure 8:
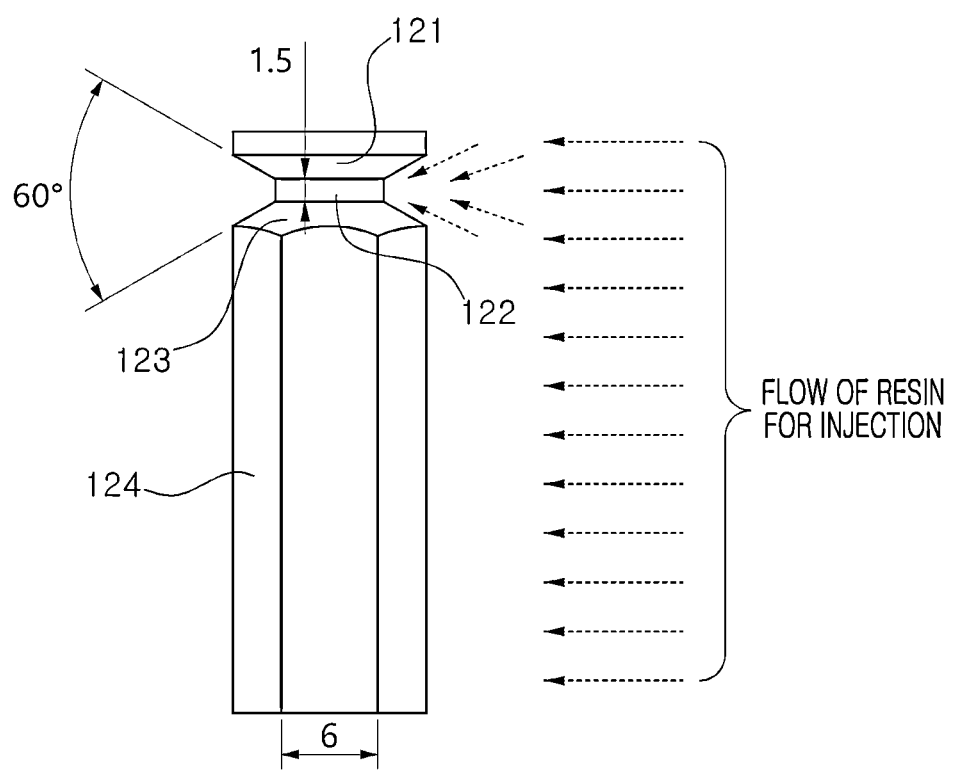
FIG. 8 is a view separately illustrating an insert nut illustrated in FIG. 7.

FIG. 7 is a view illustrating a rear-surface shape of the crash pad assembly according to the present disclosure. FIG. 8 is a view separately illustrating the insert nut 120 illustrated in FIG. 7.

The insert nut 120 is configured to include a head portion 121, a neck portion 122, a connection portion 123, and a body portion 124. A fastening bolt 130 passing through a bracket 220 that is combined with the airbag accommodation body 210 or with an upper end portion of the airbag accommodation body 210 and extends sideways is inserted into a space formed inside the body portion 124 for being fastened thereto.

The head portion 121 has an outside diameter that decreases toward the downward direction. The neck portion 122 is formed in such a manner as to extend from a lower end of the head portion 121.

The connection portion 123 is formed in such a manner as to connect the lower end of the neck portion 122 and an upper end of the body portion 124 to each other. The connection portion 123 has an outside diameter that increases toward the downward.

Therefore, as illustrated, a lateral surface of the head portion 121 and a lateral surface of the connection portion 123 make an angle of 60°±5° with respect to each other. The neck portion 122 may have, for example, a thickness of 1.5t, and one of six sides of the body portion 124 may have, for example, a width of 6t.

In this manner, the head portion 121 of the insert nut 120 according to the present disclosure is undercut in order to sufficiently overcome a repulsive force that occurs when the PAB expands.

With control of the angle and the thickness that result from the undercut head portion 121, resin is caused to flow into a mold cavity during injection, and at the same time, the repulsive force can be maximally overcome.

Furthermore, because a slide core is not used in a mold, a design restriction can be minimized.

Figure 9:
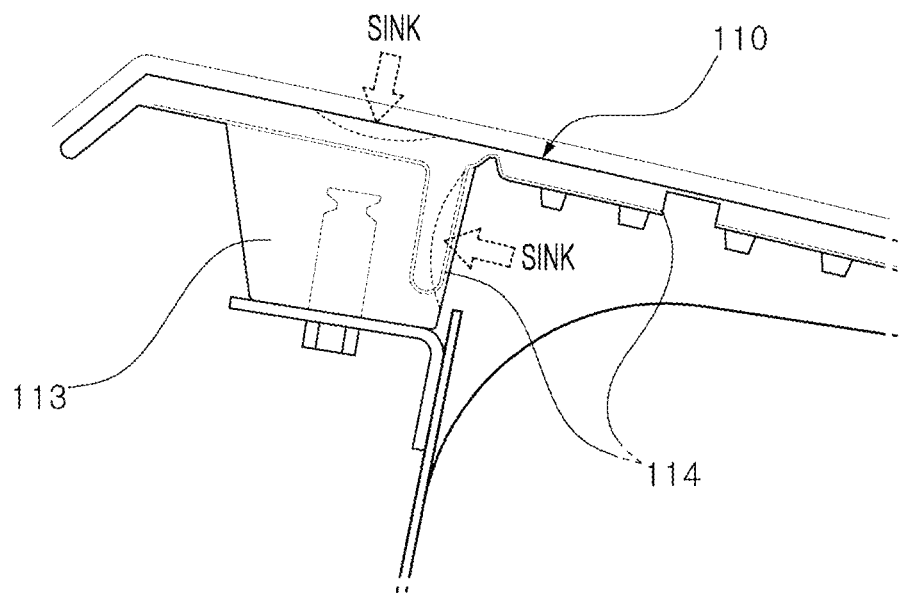
FIG. 9 is a view illustrating a problem that may occur while a crash pad according to the present disclosure is manufactured.
Figure 10:
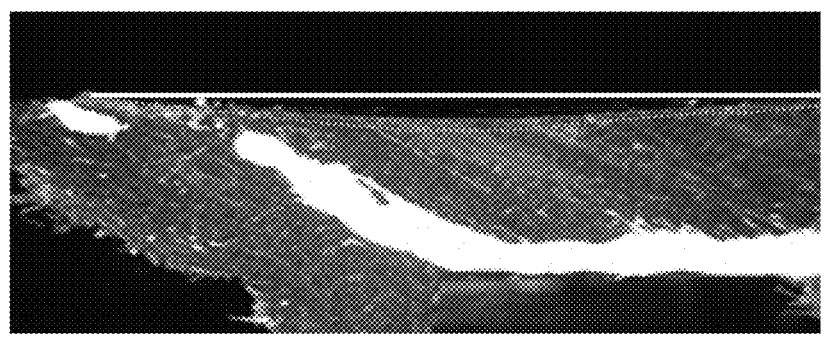
FIG. 10 is a photograph showing the problem in FIG. 9.

As illustrated in FIGS. 9 and 10, a sink may occur in the reinforcement portion 113 or the cover portion 112 due to deviation in cooling that results from a difference in the thickness of an injection material.

Figure 11:
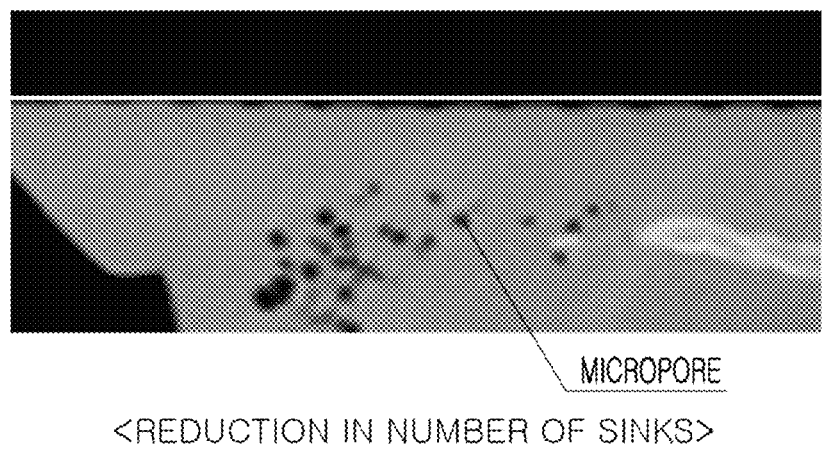
FIG. 11 is a photograph showing a cross section of the crash pad that is manufactured by a method of manufacturing the crash pad according to the present disclosure.

In order to solve this problem, according to the present disclosure, a foaming plasticizer, along with resin for injection, is additionally foaming-injected. As can be seen from a cross section shown on FIG. 11, micropores are formed, and thus the deviation in cooling that results from the difference in the thickness of the injection material is reduced. Accordingly, a phenomenon where the number of the sinks is excessively large and where a surface is excessively uneven is improved.

It is desired that the added foaming plasticizer accounts for 1 weight %±0.2 weight % of the injection resin.

The foaming plasticizer may be, for example, azodicarbonamide (ADCA) that is an organic forming agent. $C_2H_4N_4O$ that is the molecular formula of azodicarbonamide (ADCA) changes to $N_2+CO+NH_3+CO_2$. The resulting gases are nitrogen, ammonium, carbon monoxide, and carbon dioxide, and are self-extinguishing and non-toxic.

As described above, according to the present disclosure, a PAB chute is integrally formed with the C/PAD main core. Thus, process optimization can be realized, and a fusion process can be omitted. A fundamental problem of damage to the fusion portion that occurs when the door portion 111 expands can be solved.

The desired embodiment of the present disclosure is described above with reference to the accompanying drawings. However, the present disclosure is not limited to the desired embodiment. It would be apparent to a person of ordinary skill in the art that various modifications and alterations of the desired embodiment may possibly be made within the scope that does not depart from the nature and gist of the present disclosure. The resulting modification or alteration examples should fall within the scope of the claims to the present disclosure. The scope of the present disclosure should be defined by the claims.

What is claimed is:

1. An airbag chute-integrated crash pad assembly comprising:
    a main core including:
        a door portion configured to expand when an airbag expands, and
        a cover portion mounted on a dash board, the cover portion corresponding to an outside region of the door portion;
    at least one reinforcement portion extending downward from a lower surface of the cover portion; and
    a scrim provided as a fabric woven from yarns, portions of the scrim being built into an inside, respectively, of the door portion, and the at least one reinforcement portion by injection for insertion,
    wherein the door portion and the cover portion are separated by a hinge groove that is formed in a lower surface of the main core, and the hinge groove is configured to form an expansion line,
    wherein the at least one reinforcement portion is combined with an airbag accommodation body that accommodates a passenger airbag (PAB),
    wherein the portions of the scrim are built into the at least one reinforcement portion so as to be parallel to a lateral surface of the at least one reinforcement portion and configured to make a right angle with respect to the portions of the scrim that are built into the door portion,
    wherein the portions of the scrim are built into the at least one reinforcement portion to have a parallelly extending part that is in parallel to the lateral surface of the at least one reinforcement portion and a sideways extending part that extends laterally from a lower end portion of the parallelly extending part,
    wherein the sideway extending part is formed closer to a bracket that is combined with the airbag accommodation body than the cover portion.

2. The airbag chute-integrated crash pad assembly of claim 1, wherein a hinge groove is additionally formed in a lower surface of the door portion and configured to extend across the door portion.

3. The airbag chute-integrated crash pad assembly of claim 1, wherein the at least one reinforcement portion is formed on the lower surface of the cover portion along a circumference of the door portion.

4. The airbag chute-integrated crash pad assembly of claim 3, wherein the at least one reinforcement portion includes a first reinforcement portion and a second reinforcement portion, and the first and second reinforcement portions are arranged to be spaced apart from each other.

5. The airbag chute-integrated crash pad assembly of claim 4, wherein the first and second reinforcement portions are configured to extend vertically downward from the lower surface of the cover portion.

6. The airbag chute-integrated crash pad assembly of claim 4, further comprising:
    a plurality of insert nuts formed between the first reinforcement portion and the second reinforcement portion, and arranged to be spaced apart from each other.

7. The airbag chute-integrated crash pad assembly of claim 6, wherein the plurality of insert nuts is integrally formed with the main core by injection for insert.

8. The airbag chute-integrated crash pad assembly of claim 7, wherein each of the plurality of insert nuts comprises:
    a head portion having an outside diameter that decreases increases toward a downward direction;
    a neck portion extending from a lower end of the head portion;
    a connection portion extending from a lower end of the neck portion and having an outside diameter that increases toward the downward direction; and
    a body portion extending from a lower end of the connection portion and having a space inside.

9. The airbag chute-integrated crash pad assembly of claim 8, wherein a lateral surface of the head portion and a lateral surface of the connection portion of each of the plurality of insert nuts make an angle of 60°±5° with respect to each other, when viewed from side.

10. The airbag chute-integrated crash pad assembly of claim 3,
    wherein a portion among the portions of the scrim is built into an inside of the cover portion.

11. The airbag chute-integrated crash pad assembly of claim 10, wherein the portions of the scrim are built into the door portion and the cover portion, respectively, in such a manner as to be parallel to lower surfaces, respectively, of the door portion and the cover portion.

12. The airbag chute-integrated crash pad assembly of claim 3, wherein a pore is formed inside the main core by foaming injection.

* * * * *